April 17, 1962 A. H. BULLARD, JR 3,029,638
CHARACTERIZED SIGNAL ELECTRICAL MEASURING SYSTEM
Filed Jan. 28, 1960 2 Sheets-Sheet 1
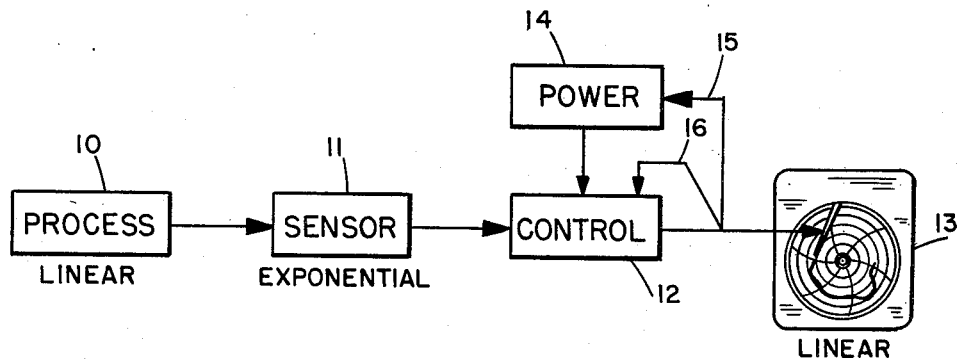
FIG. I
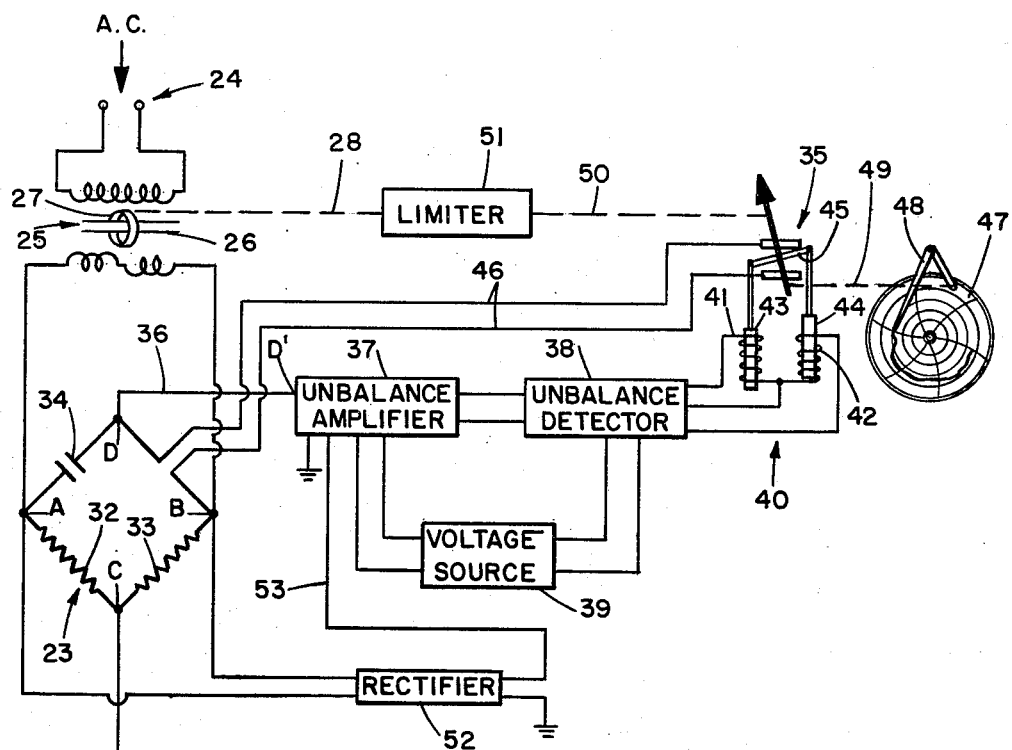
FIG. II
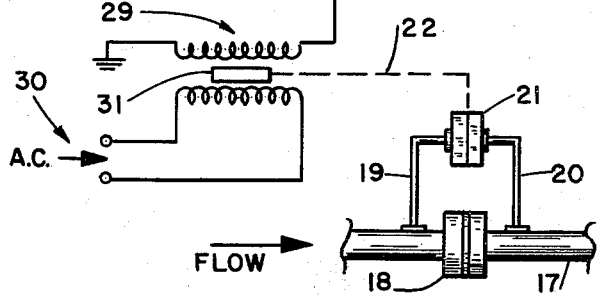
INVENTOR
ALVAN H. BULLARD JR
BY
Lawrence H. Dalton
AGENT April 17, 1962   A. H. BULLARD, JR   3,029,638
CHARACTERIZED SIGNAL ELECTRICAL MEASURING SYSTEM
Filed Jan. 28, 1960   2 Sheets-Sheet 2
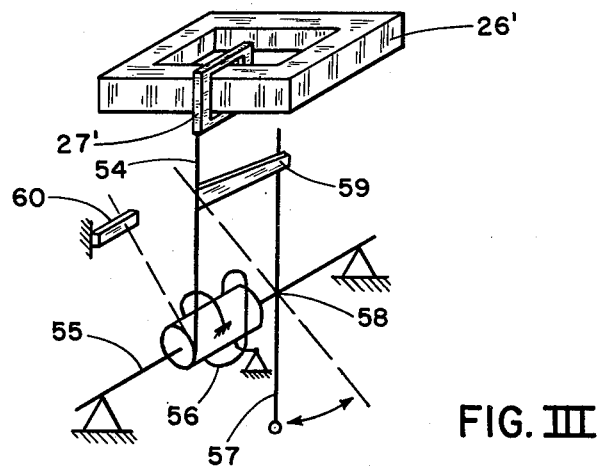
FIG. III
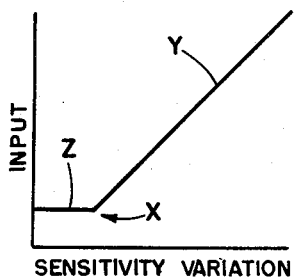
SENSITIVITY VARIATION
FIG. IV
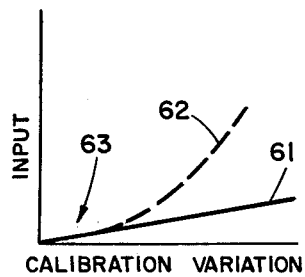
CALIBRATION VARIATION
FIG. V
INVENTOR
ALVAN H. BULLARD JR
BY
Lawrence H. Patton
AGENT United States Patent Office 3,029,638
Patented Apr. 17, 1962

3,029,638
CHARACTERIZED SIGNAL ELECTRICAL MEASURING SYSTEM
Alvan H. Bullard, Jr., Needham, Mass., assignor to The Foxboro Company, Foxboro, Mass., a corporation of Massachusetts
Filed Jan. 28, 1960, Ser. No. 5,193
3 Claims. (Cl. 73—205)

This invention relates to variable condition measuring systems, such as industrial instrumentation systems, and has particular reference to electrical systems wherein the measured variable is represented on an exponential basis.

In the present invention, a system is provided wherein such an exponential condition is automatically changed to another function.

An example of the field of this invention is in the customary square root signal system of a differential pressure type of flow measurement.

An example of this invention in that field is the extraction of the square root function in such a flow measuring system to provide a linear signal condition in representation of the measured flow.

In furtherance of the example of this invention, an electrical measuring null balance circuit system is used, wherein the variable measured signal upsets the system. Automatic rebalance means is used to rebalance the system with the rebalance action a measure of the signal change, and simultaneously the power input to the system is automatically adjusted to change the signal exponential.

It is therefore an object of this invention to provide a new and improved electrical measuring system.

It is a further object of this invention to provide an exponential variant electrical measuring system wherein the operating power to the system is automatically varied as a signal exponential conversion.

A further object of this invention is to provide an electrical flow measuring system on the basis of differential pressure and a square root factor, wherein the square root function is automatically extracted by automatic control of the operating power to the system.

Other objects and advantages of this invention will be in part apparent and in part pointed out hereinafter.

In the drawings:

FIGURE I is a block diagram of a measuring system embodying this invention;

FIGURE II is a schematic showing of this system of FIGURE I, in greater detail, as a series arranged voltage type of system;

FIGURE III is an illustration of a mechanical movement limiting device for providing a minimum power input to a system according to this invention;

FIGURE IV is a graph, illustrating the effect of the device of FIGURE III on the sensitivity of a system according to this invention; and FIGURE V is a graph, illustrating the record provided by the system according to this invention as compared to a prior art exponential record.

The FIGURE I showing illustrates a process unit 10 which may be, for example, a variable fluid flow such as liquid or gas in a pipe line. A sensor unit 11 is indicated as being affected by the process unit 10, and may be in the form of a conventional differential pressure unit. The output of the sensor unit 11 is applied to a control unit 12, which may be a balanceable electrical circuit including a bridge circuit, and the output of the control device is applied to a recording device 13 in a conventional manner. A power unit 14 is provided for the system, and is indicated as being applied to the control unit 12. Further, the output of the control unit 12 is fed back as indicated at 15, to vary the operating power input to the control device 12. The output of the control device 12 is also fed back on itself as indicated at 16, for the purpose of automatically rebalancing the control unit.

In the FIGURE I system, linear progressions in the process 10 result in exponential pregressions in the sensor unit 11, and the operation of the control device and its feedbacks result in linear progressions as applied to the recorder device 13.

The FIGURE II schematic illustrative embodiment of this invention is an electrical balanceable system in a series, voltage type of arrangement.

The FIGURE II process is indicated as a fluid flow through a pipe 17, having an orifice plate unit 18 therein, with upstream and downstream pressure taps 19 and 20 on either side of the orifice plate unit 18. The pressure taps 19 and 20 are led into a conventional differential pressure unit 21 which provides an output motion, indicated by dotted line 22, with a square root factor with respect to the flow increments in the pipe 17.

The control arrangement of FIGURE II is based on a system including an electrical bridge 23, which on the one hand is powered from a source of alternating current 24, and on the other hand is supplied with a varying measurement signal from the output 22 of the differential pressure unit 21 in representation of flow changes in the pipe 17. Thus the bridge system is energized from the source 24 and is upset according to variable condition changes in the differential pressure output 22.

The bridge system is supplied with power through a variable differential transformer 25, which has a core 26 therein on which a shorted turned ring 27 is mounted. The ring 27 is movable along the core 26 in the conventional differential transformer coupling varying action, as a means of varying the operating power applied to the bridge system, and this is accomplished by a feedback arrangement as indicated by dotted line 28, and explained hereinafter.

The variable condition signal from the flow sensing arrangement and through the differential pressure output 22 is applied to the bridge 23 through a differential transformer arrangement 29. This differential transformer 29 is supplied from an alternating current source 30, and the signal to the bridge 23 is varied by a movable core 31 which varies the coupling in the transformer 29 according to the movement of the output 22 of the differential pressure unit 21.

The bridge 23 includes a pair of resistors 32 and 33 as two legs of the bridge, a condenser 34 as a third leg of the bridge and a fourth leg of the bridge in the form of a variable condenser 35, located at the right of the drawing, FIGURE II.

The power input to the bridge system is across opposed corners A and B of the bridge 23, the signal input of the bridge system is applied to bridge corner C, and the signal output is taken from brdge corner D.

Further, in re FIGURE II, a change in the fluid flow in the pipe 17 causes an upset in the voltage to ground of the bridge system and this upset is felt in the output line 36 which leads to an unbalance amplifier 37 and an unbalance detector 38 in a series arrangement, and is powered from a voltage source 39, as indicated. The application of the variable condition change signal to the bridge system provides a change in the voltage between the bridge point D and ground, and this change is applied to the unbalance amplifier 37 as a change in the voltage between point D' and ground.

The output of the series arrangement of unbalance amplifier and unbalance detector 37, 38, is applied to an electro-mechanical transducer unit 40. This unit comprises a pair of coils 41 and 42 having plungers 43 and 44 therein and connected to operate a tilt bar 45. The tilt bar operates to vary the rebalance condenser 35 which is connected as indicated through leads 46 as one leg of the electrical bridge 23. Adjustment of the condenser 35 varies the voltage from bridge point D to ground. The mechanical movement of the tilt bar 45 is applied to a recording device 47, that is, to a recording pen 48 therein through a mechanical connection indicated by dotted line 49.

A further application of the mechanical movement output of this device, as represented by the movement of a tilt bar 45, is through a mechanical connection indicated by dotted line 50. This connection leads, through a movement limiting device 51 and the mechanical connection 28, to the shorted ring 27 for movement of the ring 27 along the core 26 of the power input differential transformer 25. Thus this transformer variably supplies power to the balanceable bridge system.

The effect of the movement limiting device 51 in the feedback to the variable differential transformer 25, is to stop the power diminishing movement of the shorted ring 27, at a minimum point in the area of minimum signal.

If this were not done over a particular range in the minimum signal area, the bridge 23 would essentially not be energized and the feedback operation of the device would be ineffective.

The effect of thus holding the shorted ring stationary is to transpose the system in the minimum area to an ordinary exponential system. For the area of increasing power input to the bridge causing increasing sensitivity a variable bias is applied to a non linear gain device such as a remote cut-off pentode (not shown) in the unbalance amplifier 37 from the power input 24, as taken off from points A and B of the input to the bridge 23, through a rectifier 52, and a lead 53 to the unbalance amplifier.

The device for limiting the mechanical feedback movement to the transformer 25 is shown in FIGURE III and the cutoff point it provides is indicated in FIGURE IV as point X.

The FIGURE III device includes the input transformer core 26' and the shorted ring 27' as movable along this core, with the ring 27 mounted on an arm indicated schematically at 54 and movable about a pivot arm 55 which is provided with a bias spring 56. The FIGURE II feedback movement indicated by dotted line 50 is applied to an arm 57 in FIGURE III schematically indicated and pivoted about a point 58 on the arm 55, with the shorted ring support arm 54 spring biased by the spring 56 against the movable arm 57 by means of a side member 59.

Thus as the feedback movement changes, the FIGURE III arm 57 moves and allows the shorted turn member 27' to move, under the bias action of spring 56, along the transformer core 26'. When the desired limit is reached as by means of a stop indicated at 60 in FIGURE III, the feedback movement may continue, and the FIGURE III arm 57 continues to move without further movement of the shorted turned ring 27'.

In the action of the device of FIGURE III, with reference to the graph of FIGURE IV, the area of free movement of the shorted ring 27' is indicated by the rising line Y in FIGURE IV. The area of operation after the ring 27' has been applied to the stop 60 in FIGURE III is indicated at Z.

The effect of making this change in the operation of the instrument at this low level zero area situation is indicated in FIGURE V by the showing of the calibration of the linear output as at 61, and the exponential type output as at the dotted line 62. The dotted line 62 represents the exponential record obtained without the feedback to the power transformer as in FIGURE II, at 25. However, with the use of the limiting device of FIGURE III the area indicated at 63 of FIGURE V is a single curve, and the sensitivity of the device is not unduly affected. On the other hand if desired, the zero point of operation of the instrument may be placed at point X of FIGURE IV. This is the same as the point of departure of the two curves 62 and 61 of FIGURE V and the same as the point of termination of movement of the shorted ring 27' in the device of FIGURE III by the stop member 60.

From this consideration of the system of FIGURE II, it may be seen that a change in the variable condition of flow in pipe 17 creates an unbalance in the bridge system which is felt as an output in the unbalance amplifier and detector systems 37 and 38. This output is transposed into mechanical movement through the output coil system 40. Without the feedback to the transformer 25, this mechanical movement would have the same exponential function as does the variable condition signal input to the bridge from the differential pressure unit 21. In many instances this is undesirable since it necessitates some form of transfer to linearity or other exponential function for more desirable chart records or association with other control indicating recording or control devices. Thus the feedback to the power input transformer 25 is provided as a means of extracting the exponential function, in this case the square root function of the measured variable input signal.

This device may be used to change the signal square root function to some other characteristic as desired, by varying the form of the rebalancing condenser 35 and/or the form of the input transformer 25 shorted ring 27 combination.

This system is in effect a multiplier wherein the output mechanical movement is applied twice, that is, it is squared to compensate for the square root input. Thus the mechanical movement as in the pen position of the recording device is the square root of the input, that is, the exponential factor of the input has been removed.

This system has the advantage of minimum loading on the system by the variation of the power input, since a high impedance is built into the system across a low impedance transducer. A further advantage is infinite resolution. Another advantage is the long life of the device since there is no wear problem such as is inherent in devices utilizing slide wire resistors as rebalancing members. A further advantage is the low torque required to move the rebalancing devices of this invention.

This invention therefore provides a new and improved electrical measuring system for the handling of characterized signals in representation of variable condition changes.

As many embodiments may be made of the above invention and as changes may be made in the embodiments set forth above without departing from the scope of the invention, it is to be understood that all matter hereinbefore set forth, or shown in the accompanying drawing, is to be interpreted as illustrative only and not in a limiting sense.

I claim:

1. An electrical measuring device for treatment of a characterized measurement signal to change the characterization to a different function; said device comprising, in combination, a series arranged, voltage-to-ground variable bridge circuit system comprising an electrical bridge, a variable condenser included in one arm of said bridge, a ground connection from one corner of said bridge at the end of one diagonal thereof, and a variable coupling coil included in said ground connection, a variable coupling coil electrical power input to said bridge across the other diagonal of said bridge, means for varying the voltage-to-ground of said system in accordance with a characterized measurement signal, said last means including a variable condition measurement device for producing said measurement signal and varying said ground connection coupling in accordance therewith to produce said voltage-to-ground variance of said system, means for electrically detecting said voltage-to-ground variance across said one diagonal of said bridge, means for translating the output of said detecting means into mechanical movement, and means for automatically applying said movement to adjust the voltage-to-ground of said system by adjusting said electrical condenser and simultaneously to vary the coil coupling of said power input, whereby the output of said detection means is characterized differently with respect to said measurement signal, said movement thus being applicable to provide a record of said measurement signal on a function basis which is predeterminedly different from that of said characterized measurement signal.

2. An electrical measuring device for treatment of a characterized measurement signal to change the characterization to a different function; said device comprising, in combination, a series arranged, voltage-to-ground variable bridge circuit system comprising an electrical capacity bridge having a variable condenser included in one arm of said bridge, a ground connection from one corner of said bridge at the end of one diagonal thereof, and a variable coupling coil included in said ground connection, said coil comprising the secondary of a movable core transformer, a variable coupling coil electrical power input to said bridge across the other diagonal of said bridge, said power input including a transformer with a core and a shorted ring coil movable relatively along said core, means for varying the voltage-to-ground of said system in accordance with a characterized measurement signal, said last means including a variable condition measurement device for producing said measurement signal in the form of mechanical movement and varying said ground connection coupling in accordance therewith by moving the core of said ground connection transformer to produce said voltage-to-ground variance of said system, means for detecting said voltage-to-ground variance across said one diagonal of said bridge of said system, means for translating the output of said detecting means into mechanical movement, and means for automatically applying said movement to adjust the voltage-to-ground of said system by adjusting said bridge arm electrical condenser, simultaneously to vary the coil coupling of said power input by producing relative movement between said power input transformer core and said shorted ring, and simultaneously to operate a recording device, whereby the output of said detection means is characterized differently with respect to said measurement signal, said movement thus providing a record in said recording device on a function basis which is predeterminedly different from that of said characterized measurement signal.

3. An electrical, flow measuring device for linearizing a square root measurement signal; said device comprising, in combination, a series arranged, voltage-to-ground variable bridge circuit system comprising an electrical capacity bridge having a variable condenser included in one arm of said bridge, a ground connection from one corner of said bridge at the end of one diagonal thereof, and a variable coupling coil included in said ground connection, said coil comprising the secondary of a movable core transformer, a variable coupling coil electrical power input to said bridge across the other diagonal of said bridge, said power input including a transformer with a core and a shorted ring coil movable relatively along said core, means for varying the voltage-to-ground of said system in accordance with a square root measurement signal, said last means including a variable condition measurement device for producing said measurement signal in the form of mechanical movement and varying said ground connection coupling in accordance therewith by moving the core of said ground connection transformer to produce said voltage to ground variance of said system, means for amplifying and detecting said voltage-to-ground variance across said one diagonal of said bridge of said system, means for applying a sensitivity factor to the input of said amplifying and detecting means from said bridge system power input and by-passing said bridge system, means for translating the output of said detecting means into mechanical movement, and means for automatically applying said movement to adjust the voltage-to-ground of said system by adjusting said bridge arm electrical condenser, simultaneously to vary the coil coupling of said power input by producing relative movement between said power input transformer core and said shorted ring, and means for mechanically limiting said relative core and ring movement to provide a minimum in said sensitivity factor and simultaneously to operate a recording device, whereby the output of said detection means is linear with respect to said square root.

References Cited in the file of this patent
UNITED STATES PATENTS

| | | |
|---|---|---|
| 2,317,807 | Ryder | Apr. 27, 1943 |
| 2,662,540 | Rutherford et al. | Dec. 15, 1953 |
| 2,675,510 | Belcher | Apr. 13, 1954 |
| 2,718,144 | Hornfeck | Sept. 20, 1955 |
| 2,919,578 | Sink | Jan. 5, 1960 |